United States Patent [19]

Ramunas

[11] Patent Number: 4,809,995
[45] Date of Patent: Mar. 7, 1989

[54] QUICK-CHANGE MECHANISM WITH ECCENTRIC LOCK

[75] Inventor: Valdas S. Ramunas, Euclid, Ohio

[73] Assignee: Kennametal Inc., Latrobe, Pa.

[21] Appl. No.: 134,346

[22] Filed: Dec. 17, 1987

[51] Int. Cl.[4] .............................................. B23B 31/10
[52] U.S. Cl. ....................... 279/1 B; 82/160;
279/1 TE; 279/77; 403/322; 403/374;
403/DIG. 8; 409/234
[58] Field of Search ............... 279/1 B, 1 TE, 81, 77;
82/36 B, 36 R, 37; 407/46, 101, 106, 107;
409/232, 234; 403/322, 374, DIG. 4, DIG. 8

[56] References Cited

U.S. PATENT DOCUMENTS

| | | | |
|---|---|---|---|
| 1,003,369 | 9/1911 | Peterson et al. | 279/76 |
| 1,806,694 | 12/1929 | Markson | 279/77 |
| 1,899,326 | 2/1933 | Harrington | 279/77 |
| 2,433,127 | 12/1947 | Kinzbach | 279/77 |
| 2,583,264 | 1/1952 | Herrmann | 409/234 |
| 2,695,788 | 11/1954 | Baier | 279/77 |
| 2,816,770 | 12/1957 | De Vlieg et al. | 279/97 |
| 3,215,445 | 11/1965 | Benjamin et al. | 279/97 |
| 3,356,325 | 12/1967 | Schnase | 403/322 X |
| 3,466,955 | 9/1969 | Stier | 82/36 |
| 3,545,319 | 12/1970 | Anderson et al. | 82/36 R |
| 4,054,394 | 10/1977 | Neuman | 403/374 X |
| 4,597,699 | 7/1986 | Ramunas | 409/232 |
| 4,767,246 | 8/1988 | Camloh et al. | 279/81 X |

FOREIGN PATENT DOCUMENTS

| | | | |
|---|---|---|---|
| 3529605 | 2/1986 | Fed. Rep. of Germany | 407/107 |
| 224250 | 7/1985 | German Democratic Rep. | 82/36 B |

*Primary Examiner*—Gil Weidenfeld
*Assistant Examiner*—Steven C. Bishop
*Attorney, Agent, or Firm*—Thomas R. Trempus

[57] ABSTRACT

A quick-change mechanism is provided between a male member and a female member which has a socket with an axis. A flange is provided on each member, and in the flange of the female member an eccentric circular cam is pivotably mounted on one side of the socket. The cam may be pivoted through an arc between a locked and an unlocked condition in a single plane. The unlocked condition moves the cam laterally outwardly beyond the cam follower surface in the male member. As the cam is rotated towards the locked condition, the cam locking surface moves in a single plane laterally inwardly and establishes an axially inward force on the cam follower surface. The quick-change mechanism is small and compact and contained entirely within the flange of the female member. The foregoing abstract is merely a resume of one general application, is not a complete discussion of all principles of operation or applications, and is not to be construed as a limitation on the scope of the claimed subject matter.

17 Claims, 1 Drawing Sheet

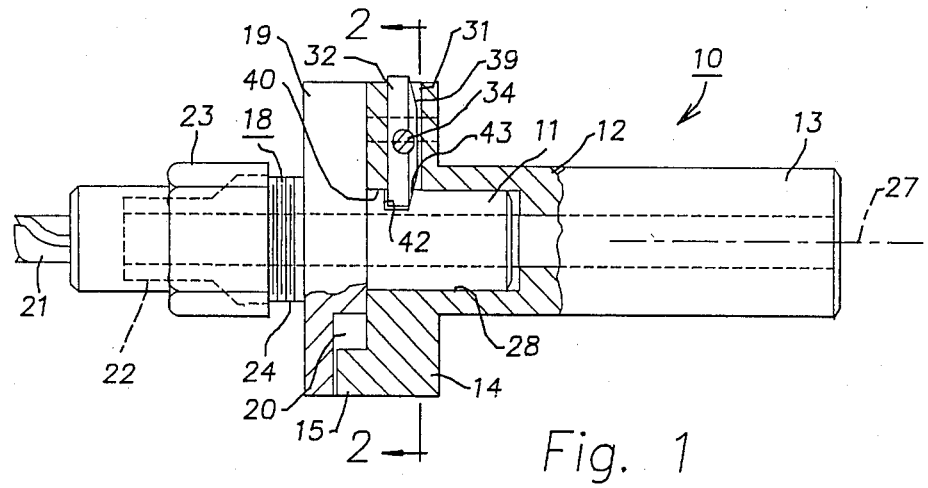
Fig. 1
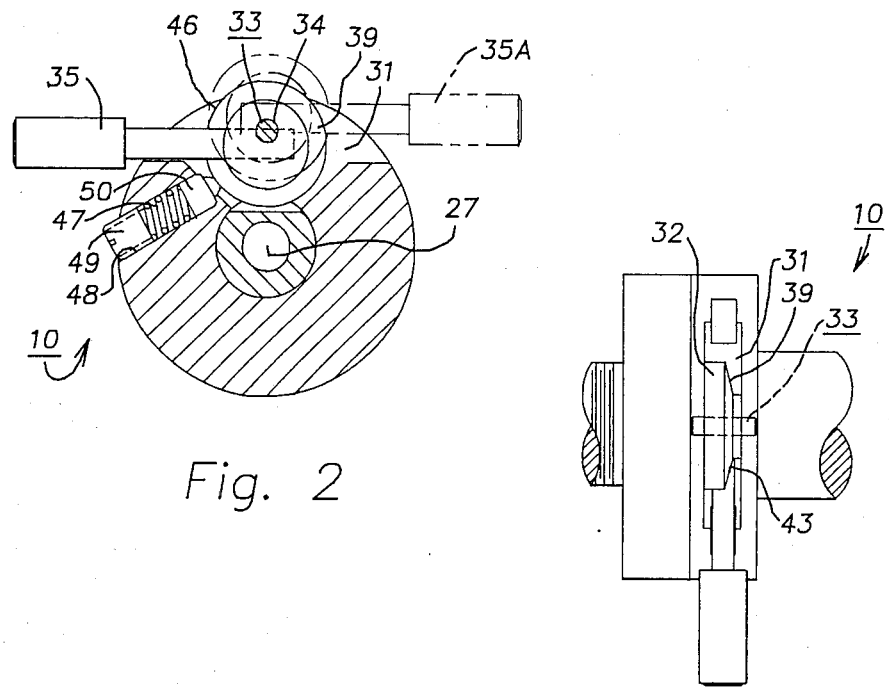
Fig. 2
Fig. 3

QUICK-CHANGE MECHANISM WITH ECCENTRIC LOCK

BACKGROUND OF THE INVENTION

The prior art has known various locking devices. U.S. Pat. No. 1,806,694 discloses an eccentrically mounted washer held by a screw and movable into a notch on a punch to hold the punch in place. U.S. Pat. No. 1,003,369 discloses a chuck wherein a square, toothed gripping device rotates slightly to grip the periphery of the head of a bolt. U.S. Pat. No. 1,899,326 discloses a rotatable lock member with an enlarged head carrying a helical cam surface to enter a slot in a tool and force it axially. U.S. Pat. No. 4,597,699 discloses a rotatable eccentric cam locking member which can engage either axial side of a conical button coaxially on the tool.

It is desired to achieve a quick-change mechanism to permit fast changing of tools on small size multi-spindle machines. Most of these machines have limited space in their tooling area, so that any quick-change device that could be accommodated has to be very compact. The structure disclosed in U.S. Pat. No. 4,597,699 is relatively complex and too large for these small size machine tools. The structure shown in U.S. Pat. No. 1,003,369 cannot maintain the bolt coaxial with the chuck, and would only be useful for the relatively imprecise positioning required in threading a bolt into a nut. Further, it does not lock the bolt axially into the chuck. The structure disclosed in U.S. Pat. No. 1,806,694 is not a quick-change device because it would require the use of two screwdrivers or like implements, one to pry the eccentric washer into or out of engagement with the notch, and the other screwdriver to tighten or loosen the bolt 19. The structure disclosed in U.S. Pat. No. 1,899,326 requires a specially machined locking device with a helical cam surface machined on it, plus an arcuate notch in the head in a position to receive the tool. Also, a specially machined notch must be provided in the tool with a corresponding helical surface therein.

SUMMARY OF THE INVENTION

Accordingly, the problem to be solved is how to construct a compact, quick-change mechanism which is simple and easily manufactured without any special machining being required.

This problem is solved by a quick-change mechanism comprising a male member and a female member, said female member having an axis and a coaxial socket having an open outer end adapted to receive said male member, a flange on said female member, a recess in one side of said flange communicating with said socket, a cam disposed in said recess, a pivotable mount generally parallel to said axis for said cam in said flange, said cam being adapted to be pivoted on said mount through an arc in a single plane between an unlocked and a locked condition, a locking cam surface on said cam, a cam follower surface on said male member facing said socket open outer end, and the pivotable mount of said cam establishing said cam locking surface out of contact and laterally outwardly beyond said cam follower surface with said cam in said unlocked condition, and said cam being movable from said unlocked to said locked condition for moving said cam locking surface in said single plane laterally inwardly and establishing an axially inward component of force on said cam follower surface to force said male member securely axially inwardly into said female member socket.

Accordingly, an object of the invention is to provide a compact and simple quick-change mechanism for a tool.

Another object of the invention is to provide an external eccentric mounted in the flange of a tool holder for locking a tool in a socket of the tool holder.

Other objects and a fuller understanding of the invention may be had by referring to the following description and claims, taken in conjunction with the accompanying drawing.

BRIEF DESCRIPTION OF THE DRAWING

FIG. 1 is a longitudinal, sectional view through a tool holder embodying the invention;

FIG. 2 is a sectional view on line 2—2 of FIG. 1; and

FIG. 3 is a plan view of the tool holder of FIG. 1.

DESCRIPTION OF THE PREFERRED EMBODIMENT

The figures of the drawing illustrate a quick-change mechanism 10 comprising a male member 11 and a female member 12. The quick-change mechanism has advantages for use in small size multiple spindle machine tools which have limited space in their tooling area. Because of this limited space, the normal quick-change devices cannot be accommodated. Accordingly, as an example, this quick-change mechanism 10 is illustrated with a female member 12 being an adapter having a shank 13 and a flange 14. The shank 13 may be a conical tapered shank, but is illustrated as being a cylindrical shank for mounting in the machine tool. The flange 14 is a standard flange mount adapter with a drive key 15. The male member 11 is illustrated as a collet chuck 18 having a flange 19 with a notch 20 to receive the drive key 15 for transmittal of drive torque. The collet chuck 18 further has suitable means to hold a tool 21, such as any one of several collets 22, to hold various-sized tools and a tightening nut 23 which may tighten on threads 24.

The male member 11 may have a conical taper, but is shown as cylindrical. It has an axis 27 and is coaxial with this axis and receivable inside a coaxial socket 28 in the female member 12. When so received, it is intended that the flange 19 of the collet chuck engage the face of the flange 14 of the adapter or female member 12.

A recess 31 is provided in one side of the flange 14 and communicates with one side of the socket 28. A circular cam 32 is disposed in this recess 31 and a pivotable mount 33 is provided for the cam within the recess 31. The pivotable mount is generally parallel to the axis 27, and in this preferred embodiment is parallel to this axis. The pivotable mount is provided by a pivot axle 34 on which the cam 32 may be journaled, or, alternatively, the cam may have a tight fit on the pivot axis and the axle journaled within the remainder of the flange 14 on either axial side of the recess 31. By this mounting, the cam 32 is adapted to be pivoted on the mount in a single plane through an arc by a handle 35 between a locked condition shown in full lines in FIG. 2 and an unlocked condition shown in dotted lines 35A in FIG. 2.

A locking cam surface 39 is provided on one face of the circular cam, that face facing away from the open outer end 40 of the socket 28. This locking cam surface is a conical surface, in the preferred embodiment an included angle of about 150 degrees. This circular cam 32 is a cam because the pivotable mount 33 is eccentric relative to the periphery, as better shown in FIG. 2.

The male member 11 has a transverse notch 42, and one part of this transverse notch is a cam follower surface 43 which faces the socket open outer end 40. In the preferred embodiment, this cam follower surface is sloping at about a 15-degree angle to match the angle on the locking cam surface 39, i.e., a tangent to the cam and follower surfaces at the place of engagement defines a line contact at about a 75-degree angle relative to the axis 27. With the handle 35 in the positive shown in FIG. 2, the cam locks the male member 11 in the socket 28, and with the handle in the unlocked condition shown in dotted lines 35A in FIG. 2, then, because of the eccentric mount, the cam is pivoted through an arc of about 180 degrees so that the cam locking surface is out of contact and laterally outwardly beyond the cam follower surface 43.

The cam 32 has a circular periphery which is a cylindrical surface in this preferred embodiment. This acts as a peripheral cam surface 46, again because of the eccentric pivotal mount. A spring 47 coacts with this peripheral cam surface, urging the cam 32 toward at least one of the locked and unlocked conditions. In the preferred embodiment shown, the spring 47 acts to urge the cam toward each one of the unlocked and locked conditions. The spring 47 is mounted in an aperture 48, held in by a threaded plug 49, and acting on a plunger 50, which in turn rides on the peripheral cam surface 46. This aperture 48 is at about a 60-degree angle relative to a line from the eccentric pivotable mount 33 to the axis 27, as shown in FIG. 2. The peripheral cam surface 46 has a high point of this cam surface which is at the same angular position as the high point of the locking cam surface 39. With this structure, movement of the handle 35 for about the first 60 degrees of movement toward the unlocked condition will slightly compress the spring 48, and thereafter the spring will help urge the handle toward the unlocked condition. In the reverse movement toward the locked condition, such movement of the handle will compress the spring 47 for about the first 120 degrees of movement, and thereafter will help movement of the handle toward the locked condition.

Operation

With the handle 35 in the unlocked condition 35A, shown in FIG. 2, the male member 11 or collet chuck 18 may be inserted or withdrawn from the socket 28. In this embodiment, the male member is adapted to be inserted and withdrawn manually and, when inserted, the flange 19 on the male member is adapted to abut the flange 14 on the female member 12. In such condition, the handle may be moved from the unlocked condition 35A to the locked condition 35 shown in FIGS. 1, 2, and 3. The first about 120 degrees of movement of the handle is resisted by the urging of the spring 48, and thereafter for the remaining about 60 degrees, the spring 48 aids such movement. The two ends of the recess 31 limit the movement of the handle 35, and hence of the cam 32, to about 180 degrees. This is the high point of the locking cam surface 39 for the locked condition of the cam 32. The unlocked condition is the low point of the cam relative to the male member 11, so that the cam locking surface is out of contact and laterally outwardly beyond the cam follower surface 43 in this unlocked condition. The cam is movable toward the locked condition, and this moves the cam locking surface in a single plane established by the pivotable mount 33. The cam moves laterally inwardly and establishes an axially inward component of force on the cam follower surface 43 to force the male member 11 securely axially inwardly into the female member socket 28. Since the pivotal mount is generally parallel to the axis 27, this arcuate movement of the cam 32 from the unlocked to the locked condition establishes both this laterally inward and axially inward component of forces.

A plane normal to the axis 27 may be considered a reference plane. The angle of a tangent to the place of contact between the cam surface 39 and cam follower surface 33 in the locked condition relative to the reference plane, plus the angle of the single plane of cam movement relative to the reference plane, is substantially equal to the angle of the locking cam surface 39 relative to this single plane. In the preferred embodiment, with the pivotal mount being parallel to the axis 27, this makes the single plane of movement in the reference plane which is normal to the axis 27. Accordingly, the above statement may be expressed mathematically as $$15° + 0° = 15°.$$

The pivotable mount 33 is eccentric relative to the circular peripheral cam surface 46 to establish this pivotable mount 33 of the cam as a pivot axis displaced from the socket axis 27 an amount greater than the radius of the socket 28. It will be noted from FIGS. 1 and 2 that the cam 32 may be constructed in a most simple manner compared to the complex construction of much of the prior art. The cam 32 starts as a simple cylindrical disc, and then the conical locking cam surface 39 is machined onto it in most any manner, by as simple a machine tool as an ordinary lathe. Then the aperture for the pivot axle 34 is drilled off center, and a hole on a radius is drilled for the handle 35 and the cam 32 is completed. The recess 31 in the flange 14 is obtained by a simple milling process perpendicular to the axis, and then an aperture is drilled through it parallel to axis 27 for the pivot axle 34. The spring 47 is an added feature which is not mandatory for operation, but merely helps to retain the cam in each of the locked and unlocked conditions. If the handle interferes with the available space in the tooling area of the machine tool, a set of radial holes can be used around the periphery of the cam and the cam rotated by a removable pin or handle. The conical locking cam surface 39 is coaxial with the circular periphery of this cam 32 and it is not coaxial with the pivot axle 34. The pivotable mount 33 is not a threaded support for the cam; instead, it is an unthreaded journal bearing, so that the cam 32 moves in a single plane rather than in a helical movement, as in some prior art. This adds to the simplicity and compactness of the entire quick-change mechanism. The entire quick-change mechanism is contained inside the flange 14 of the female member 12, which in one embodiment constructed in accordance with the invention had a flange ⅜ inch wide and 1½ inches in diameter. The quick-change mechanism may be made to fit an even smaller space.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A quick-change mechanism comprising a male member and a female member;
   said female member having an axis and a coaxial socket having an open outer end adapted to receive said male member;
   a flange on said female member;
   a recess in one side of said flange communicating with said socket;
   a cam disposed in said recess;
   a pivotable mount generally parallel to said axis for said cam in said flange;
   said cam being adapted to be pivoted on said mount through an arc in a single plane between an unlocked and a locked condition;
   a locking cam surface on said cam;
   a peripheral cam surface on said cam separate from said locking cam surface;
   spring means acting on said peripheral cam surface;
   a cam follower surface on said male member facing said socket open outer end;
   the pivotable mount of said cam establishing said cam locking surface out of contact and laterally outwardly beyond said cam follower surface with said cam in said unlocked condition; and said cam being movable from said unlocked to said locked condition for moving said cam locking surface in said single plane laterally inwardly and establishing an axially inward component of force on said cam follower surface to force said male member securely axially inwardly into said female member socket.

2. A quick-change mechanism as set forth in claim 1, including a reference plane normal to said axis; and
   the angle of a tangent to the place of contact between said cam and follower surfaces in said locked condition relative to said reference plane plus the angle of said single plane relative to said reference plane substantially equaling the angle of said locking cam surface relative to said single plane.

3. A quick-change mechanism as set forth in claim 1, wherein said cam is pivotable through an arc of about 180 degrees between said unlocked and locked conditions.

4. A quick-change mechanism as set forth in claim 1, including said cam having a high point; and
   means to limit movement of said cam toward said locked condition to the high point of said cam.

5. A quick-change mechanism as set forth in claim 4, wherein said movement limiting means is a manual handle.

6. A quick-change mechanism as set forth in claim 5, wherein said recess extends out one side of said flange; and
   said handle being movable in said recess.

7. A quick-change mechanism as set forth in claim 1, wherein said single plane of movement of said cam is normal to said socket axis.

8. A quick-change mechanism as set forth in claim 1, including establishing the pivotable mount of said cam as a pivot axis displaced from said socket axis an amount greater than the radius of said socket.

9. A quick-change mechanism as set forth in claim 1, including establishing said pivotable mount of said cam as a pivot axis parallel to said socket axis.

10. A quick-change mechanism as set forth in claim 9, including a conical surface on said cam coaxial with said circular periphery and not coaxial with said pivot axis.

11. A quick-change mechanism as set forth in claim 1, wherein said locking cam surface on said cam is a part of a conical surface.

12. A quick-change mechanism as set forth in claim 11, wherein said conical surface is on the order of a 150-degree included angle.

13. A quick-change mechanism as set forth in claim 1 wherein said spring means urges said cam toward each of said unlocked and locked conditions.

14. A quick-change mechanism as set forth in claim 1, including a high point on said cam near said locking cam surface;
   wherein said spring acts on said cam at a peripheral location of said cam displaced from said cam follower surface whereby said high point of said cam passes said spring in travel between said unlocked and locked conditions.

15. A quick-change mechanism as set forth in claim 1, wherein said pivotable mount is an unthreaded journal bearing.

16. A quick-change mechanism as set forth in claim 1, including a high point on each of said cam surfaces at the same angular position.

17. A quick-change mechanism as set forth in claim 16, wherein said spring means is displaced from the point of contact between said locking cam surface and said cam follower surface by an angle on the order of 60 degrees.

* * * * *